US012633785B2

(12) United States Patent
Aloui et al.

(10) Patent No.: US 12,633,785 B2
(45) Date of Patent: May 19, 2026

(54) METHOD FOR DETECTING AN OBJECT TO BE CHARGED ON A CHARGING DEVICE, AND ASSOCIATED CHARGING DEVICE

(71) Applicant: Continental Automotive Technologies GmbH, Hannover (DE)

(72) Inventors: Brahim Aloui, Toulouse (FR); Saïd Bouguern, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 18/440,241

(22) Filed: Feb. 13, 2024

(65) Prior Publication Data

US 2024/0291328 A1     Aug. 29, 2024

(30) Foreign Application Priority Data

Feb. 24, 2023     (FR) ...................................... 2301695

(51) Int. Cl.
*H02J 50/90* (2016.01)
*H02J 50/10* (2016.01)

(52) U.S. Cl.
CPC ............... *H02J 50/90* (2016.02); *H02J 50/10* (2016.02)

(58) Field of Classification Search
CPC .................................. H02J 50/90; H02J 50/10
USPC ......................................................... 307/104
See application file for complete search history.

(56) References Cited

U.S. PATENT DOCUMENTS

| | | | | |
|---|---|---|---|---|
| 8,442,577 B2 * | 5/2013 | Chiou | ................... | H04B 1/0057 |
| | | | | 455/434 |
| 8,929,814 B2 | 1/2015 | Cheikh | | |
| 9,479,013 B2 | 10/2016 | Joye et al. | | |
| 10,009,069 B2 * | 6/2018 | Kerselaers | ............... | H04B 5/79 |
| 10,153,644 B2 * | 12/2018 | DeVaul | ................... | H02J 50/80 |
| 2013/0099584 A1 * | 4/2013 | Von Novak, III | ...... | H02J 50/60 |
| | | | | 307/104 |
| 2013/0147427 A1 * | 6/2013 | Polu | ......................... | H04B 5/26 |
| | | | | 320/108 |
| 2014/0139036 A1 * | 5/2014 | Shijo | ....................... | H01F 38/14 |
| | | | | 307/104 |
| 2015/0054345 A1 * | 2/2015 | Monat | ..................... | H02J 50/12 |
| | | | | 307/104 |

(Continued)

FOREIGN PATENT DOCUMENTS

WO     2022/078640 A1     4/2022

OTHER PUBLICATIONS

French Search Report for French Application No. 2301695, issued Sep. 15, 2023 with translation (11 pages).

*Primary Examiner* — Alfonso Perez Borroto
(74) *Attorney, Agent, or Firm* — Buchanan Ingersoll & Rooney PC

(57) ABSTRACT

A method for detecting an object to be charged on a charging surface of a charging device, the device including at least three near-field communication antennas, two antennas each being located at one end of the device, and a third antenna being located between the two antennas. The method includes: calculating a current flowing in each of the antennas; calculating a current variation between the three antennas; comparing the variation with a predetermined current variation threshold value; and detecting an object to be charged on the surface of the charging device on the basis of the result of the comparison.

10 Claims, 3 Drawing Sheets

(56)        References Cited

U.S. PATENT DOCUMENTS

| | | | |
|---|---|---|---|
| 2015/0318896 A1* | 11/2015 | Kerselaers | H02J 7/00034 |
| | | | 455/41.1 |
| 2017/0288738 A1 | 10/2017 | Lee et al. | |
| 2022/0368159 A1* | 11/2022 | Mohammadabadi | B60L 53/51 |
| 2023/0006476 A1 | 1/2023 | Fortes Montilla et al. | |
| 2023/0336027 A1 | 10/2023 | De Almeida et al. | |

* cited by examiner

Fig. 4

METHOD FOR DETECTING AN OBJECT TO BE CHARGED ON A CHARGING DEVICE, AND ASSOCIATED CHARGING DEVICE

CROSS REFERENCE TO RELATED APPLICATION

This application claims priority to French Patent Application 2301695, filed Feb. 24, 2023, the contents of such application being incorporated by reference herein.

FIELD OF THE INVENTION

The field of the invention is the field of magnetic induction charging devices. In particular, the invention relates to a method for detecting an object to be charged located close to a magnetic induction electrical charging device, and to an associated charging device.

BACKGROUND OF THE INVENTION

Magnetic induction electrical charging technology is implemented in a system comprising a wireless electrical charging device and an electrical storage battery to be charged in a mobile terminal such as, for example, a portable user equipment, such as a mobile telephone. The electrical charging device comprises a transmission coil, or transmitting coil. The electrical storage battery comprises a receiving coil to be charged. When the transmission coil and the receiving coil are located opposite each other, variations in the magnetic field that is generated by the transmission coil cause an electric current to flow in the receiving coil, thereby charging the electrical storage battery.

Inductive charging technology meets the requirements of a standard, in this case the Qi® standard of the Wireless Power Consortium, also called the WPC standard.

In order to detect the presence of an electrical storage battery comprising a receiving coil located opposite the transmission coil of the electrical charging device, three steps are currently implemented.

In a first step, the methods of the prior art seek to detect the presence of an object located opposite the electrical charging device. For this purpose, electrical pulses, also called pings, are sent at the charging frequency via the transmission coil of the electrical charging device to the receiving coil. A ping is a continuous signal, exhibiting periodic oscillations, with a period of, for example, 300 ms, and with an oscillation time of 5 to 20 ms. The voltage or the impedance at the terminals of the transmission coil is observed. If a variation in the voltage across the terminals of the transmission coil or in the impedance of the transmission coil is detected, then there is an object opposite the transmission coil.

The detected object may be either a parasitic object or a mobile apparatus such as a mobile telephone equipped with a receiving coil for inductive electrical charging. In a second step, efforts are then made to establish digital communication with the detected object in order to identify its character. More particularly, efforts are made in this second step to ascertain whether the detected object has a receiving coil for inductive electrical charging in order to charge it. This communication is performed by modulating the amplitude of the voltage of the transmitting coil.

When digital communication is established between the transmission coil and the receiving coil of the detected object, then a third step begins. The third step makes it possible to electrically charge the receiving coil of the detected object.

However, when the vehicle, equipped with a "hands-free" access device, enters what is known as a "key search" mode, it transmits radiofrequency waves at the frequency of 125 kHz in order to locate the hands-free access device (fob or mobile telephone) around or in the vehicle. In order to avoid any electromagnetic interference that could affect the locating, the mobile telephone charging process and all transmissions carried out at the charging frequency, that is to say between 110 and 148 kHz, are stopped, this also including the inability to transmit a ping to detect the presence of the telephone on the charging surface.

Thus, during the process of locating the fob, it is not possible to detect the presence of the mobile telephone on the charging surface using the ping.

Another method known from the prior art is to use the one or more NFC (near-field communication) antennas located in the inductive charger in order to detect the presence of the electrical storage battery. The method consists in transmitting, at a fixed frequency, signals at the frequency of 13.56 MHz; if an electrical storage battery is located close to an NFC antenna, then the impedance and/or the consumption of said NFC antenna varies.

However, this method is not robust and does not make it possible to detect certain small receiving coils. This process leads to false detections of the absence of a telephone on the charging surface when said telephone may simply have moved on the surface.

Indeed, there is a large disparity of components between the various types and brands of telephones, thereby making it impossible to use a single impedance threshold for all telephones based on which it is possible to conclude that the telephone is no longer present on the charging surface.

The ambient temperature also affects the impedance measurement.

One solution would be to calibrate the current variation measured for each NFC antenna when a mobile telephone is removed from the charging surface, and to do so for each type of mobile telephone at all temperatures. This process is obviously time-consuming and does not take into account the aging of the parts, which also affects the measured impedance value.

It therefore seems impossible to detect the presence or absence of a mobile telephone on a charging surface in a reliable and robust manner by comparing the impedance measurement of an NFC coil with a predetermined threshold that is calibrated beforehand.

An aspect of the present invention aims to rectify all or some of the drawbacks of the prior art, in particular those set out above, by proposing a method for detecting an electrical storage battery of portable user equipment type on the charging surface of an inductive recharging device that makes it possible to detect any type of portable equipment in a reliable and robust manner.

SUMMARY OF THE INVENTION

An aspect of the invention relates to a method for detecting an object to be charged on a charging surface of a charging device, said device comprising at least three near-field communication antennas, two antennas each being located at one end of the device, and a third antenna being located between the two antennas, the method being characterized in that it comprises:

a. Determining a current flowing in each of the antennas,
b. Calculating a current variation between the three antennas,
c. Comparing said variation with a predetermined current variation threshold value,
d. Detecting an object to be charged on the surface of the charging device on the basis of the result of the comparison.

In one refinement, the method is triggered on the basis of a result of a comparison of a determination of a current flowing in the third antenna with a predetermined value.

Preferably, the calculation of a current variation between the three antennas takes the following form:

$$\Delta I = \left\| \left| \frac{I0}{I1} - 1 \right| - \left| \frac{I0}{I2} - 1 \right| \right\| \times 100$$

With:
I0: current flowing in the third antenna in mA
I1: current flowing in the first antenna in mA
I2: current flowing in the second antenna in mA An aspect of the invention also relates to a device for charging an object to be charged, comprising at least three near-field communication antennas, two antennas each being located at one end of the device, and a third antenna being located between the two antennas, said device being characterized in that it comprises:

a. Means for determining a current flowing in each of the antennas,
b. Means for calculating a current variation between the three antennas,
c. Means for comparing said variation with a predetermined current variation threshold value,
d. Means for detecting an object to be charged on the surface of the charging device on the basis of the result of the comparison.

In the refinement, the device furthermore comprises second means for comparing a current flowing in the third antenna with a predetermined value.

An aspect of the invention also relates to any computer program product comprising program code instructions for executing the steps of the method according to any one of the features listed above when said program is executed on a computer.

Finally, an aspect of the invention applies to any motor vehicle comprising a charging device according to any one of the features listed above.

BRIEF DESCRIPTION OF THE DRAWINGS

Other features and advantages of aspects of the invention will become more clearly apparent on reading the following description. This description is purely illustrative and should be read with reference to the accompanying drawings, in which:

FIG. 4 is a flowchart illustrating the charging method according to an aspect of the invention.

DETAILED DESCRIPTION OF THE PREFERRED EMBODIMENTS

Figure 1:
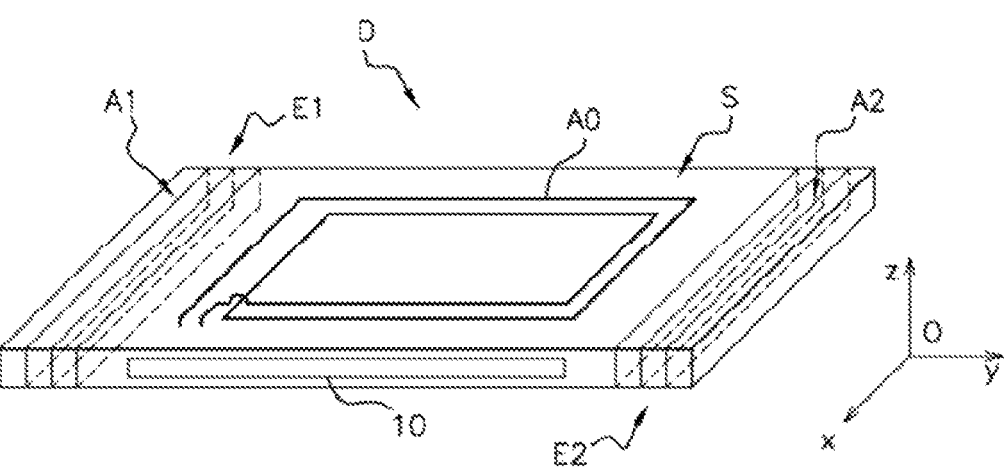
FIG. 1 is a schematic representation of a charging device according to an aspect of the invention.

The charging device D according to an aspect of the invention is illustrated in FIG. 1. It comprises an inductive charging antenna, not shown for the sake of clarity in FIG. 1, able to inductively charge a portable user equipment P, such as a mobile telephone P, once this has been placed on the charging surface S of said device. This is known from the prior art.

According to an aspect of the invention, the device D is also equipped with at least three near-field communication (NFC) antennas A0, A1, A2. The NFC antennas A0, A1, A2 are able for example to communicate with the portable equipment P if this is also equipped with a near-field communication antenna.

Near-field communication is communication at 13.56 MHz.

The charging device D also comprises a microprocessor and a memory (not shown) contained within a central processing unit 10 that is electronically connected to the charging antenna and to the NFC communication antennas in order to manage the inductive charging, to transmit and receive data through NFC communication and to carry out the various steps of the detection method according to an aspect of the invention as will be described below.

In the example illustrated in FIG. 1, the charging device D, by way of illustration and without any limitation, is in the form of a parallelepiped the length of which is parallel to a longitudinal axis y of an orthonormal reference system (O, x, y, z), the width of which is parallel to a transverse axis x, and the height of which is parallel to a vertical axis z of said reference system.

The device D comprises two edges each located at one end E1, E2 of the charging device along the longitudinal axis y.

According to an aspect of the invention, two NFC communication antennas A1, A2 are each located at one end E1, E2 of the device D.

As illustrated in FIG. 1, a first antenna A1 is wound along the transverse axis x around the first end E1, and a second antenna A2 is wound along the transverse axis x around the second end E2.

A third antenna A0 is for its part located between the first and the second antenna A1, A2. The windings of the third antenna A0 are for example planar, located in a plane parallel to the plane (O, x, y) that is itself parallel to the charging surface S.

The windings of the third antenna A0 are for example, but without any limitation, rectangular in shape.

Figure 2:
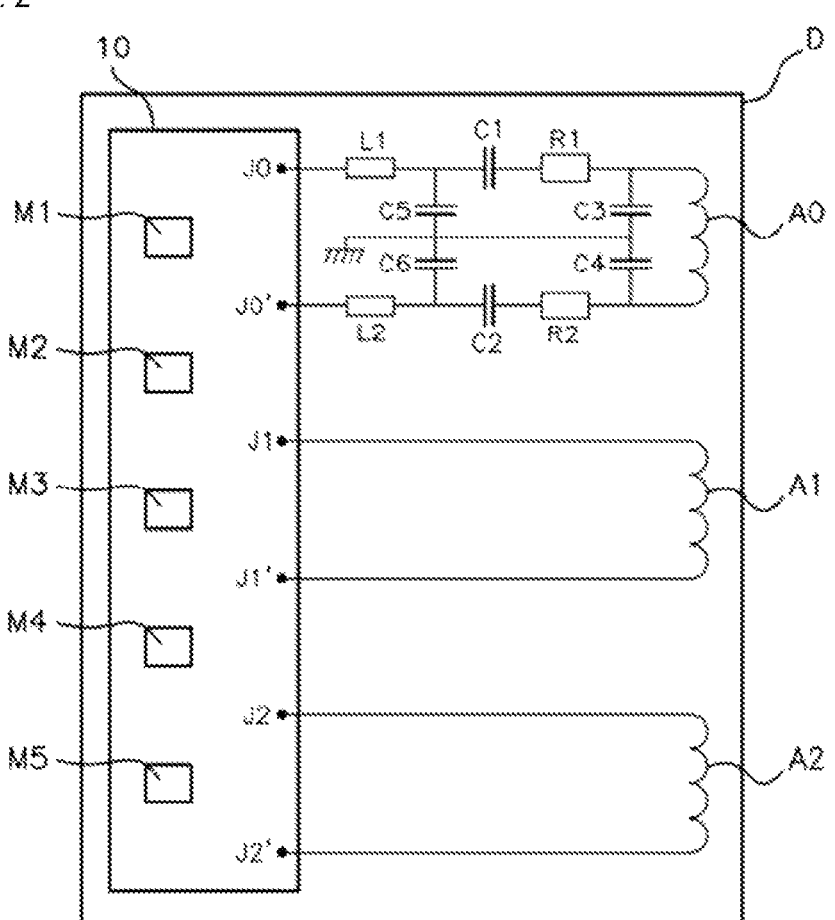
FIG. 2 is a circuit diagram of the charging device according to an aspect of the invention.

As illustrated for the third antenna A0 in FIG. 2, each antenna A0, A1, A2 is connected to the central processing unit 10 via a circuit comprising various resistors R1, R2, various capacitors C1, C2, C3, C4, C5, C6 and various inductors L1, L2, which are connected in parallel and constitute:

a. an electromagnetic emissions filter circuit,
b. an impedance-matching circuit, and
c. a circuit for monitoring the quality factor of the antenna.

This type of circuit is known to those skilled in the art and will not be described in more detail here.

According to an aspect of the invention, the charging device D is also able to:

a. determine a current or a value representative of an impedance I0, I1, I2 at the terminals of each of the antennas A0, A1, A2, b. calculate a current variation ΔI between the three antennas A0, A1, A2, c. compare said variation ΔI with a predetermined current variation threshold value S2;

d. detect an object P to be charged on the surface S of the charging device D on the basis of the result of the comparison.

For this purpose, the device D comprises:

a. means M1 for determining a current or a value representative of an impedance at the terminals of each of the antennas, b. means M2 for calculating a current variation between the three antennas, c. means M3 for comparing said variation with a predetermined current variation threshold value S2;

d. means M4 for detecting an object to be charged on the surface of the charging device on the basis of the result of the comparison.

In one refinement of an aspect of the invention, the device D is also able to compare a current or a value representative of an impedance of the third antenna A0 with a predetermined value S1.

In this refinement, the device furthermore comprises second means M5 for comparing a current value or a value representative of an impedance of the third antenna with a predetermined value S1.

The means M1 for determining a current or a value representative of an impedance, the means M2 for calculating a current variation between the three antennas A0, A1, A2, the comparing means M3 and the detecting means M4, as well as the second comparing means M5, are for example in the form of software, and are contained within the central processing unit 10.

The means M2 for calculating a current variation between the three antennas A0, A1, A2 may use any mathematical formula for evaluating an overall current variation on the three antennas A0, A1, A2.

Preferably, the current variation ΔI (%) is calculated as follows:

$$\Delta I = \left\|\left|\frac{I0}{I1} - 1\right| - \left|\frac{I0}{I2} - 1\right|\right\| \times 100 \qquad \text{[Math 1]}$$

With:

I0: current or value representative of the impedance of the third antenna in mA, I1: current or value representative of the impedance of the first antenna in mA, I2: current or value representative of the impedance of the second antenna in mA.

As explained by the mathematical formula below (cf. [Math 2]), the current flowing in an antenna is in fact related directly to the impedance of said antenna, by the value of the supply voltage of the NFC transmitter, which is constant. Therefore, the value of the current flowing in each antenna is representative of the value of the impedance of said antenna.

The current or the value representative of the impedance of an antenna Ai is calculated as follows:

$$Ii = \frac{V}{|Zi|} \qquad \text{[Math 2]}$$

With:

V: supply voltage of the NFC transmitter in volts, default value equal to 3.3 volts, Zi: Value of the impedance of the antenna Ai measured at the terminals of the NFC transmitter: varies according to the antenna connected to the transmitter because there is only ever one antenna supplied with power at a time.

When no telephone P is located facing the antenna Ai, the NFC transmitter being designed to resonate at the near-field communication frequency, that is to say at F=13.56 MHz, the value of the impedance of the antenna Ai is then high, and therefore the value representative of the impedance Ii is low.

On the other hand, when a mobile telephone P (or any metal object) is located facing the antenna Ai, there is then a drop in the value of the impedance Zi at the resonant frequency F, and the value representative of the impedance Ii is then high.

The current variation ΔI that is thus calculated is a value between a minimum value when the surface S is not occupied by a mobile telephone P and a maximum value when a mobile telephone P is placed on the charging surface S.

The comparing means M3 are able to compare the current variation ΔI with a predetermined current variation threshold value S2, above which it may be concluded that a mobile telephone P is present on the charging surface S. For example, considering the values in the table below (cf. Table 1), the threshold may be set at S2=8% for one and the same mobile telephone P, and then extrapolated to multiple mobile telephones P.

To implement the refinement of an aspect of the invention, the device measures (as will be described below) the current of the third antenna A0, and then compares this current with a predetermined threshold S1 that makes it possible to decide whether or not there is a telephone placed on the charging surface S.

The detection method illustrated in FIG. 4 will now be described.

In a first step E1, the currents or the values representative of the impedances I0, I1, I2 of the three antennas A0, A1, A2 are determined.

In a second step E2, the current variation ΔI between the three antennas A0, A1, A2 is calculated according to the formula described above (cf. [Math 1]).

In a third step E3, the current variation ΔI that is thus calculated is compared with a predetermined current variation threshold value S2, above which it is considered that an object to be charged, in this case a mobile telephone P, is located on the charging surface S.

If the current variation ΔI is greater than this threshold S2, then it is considered that a mobile telephone P is located on the charging surface S (step E4a).

If the current variation ΔI is lower than this threshold S2, then it is considered that there is no mobile telephone P located on the charging surface S (step E4b).

Figure 3:
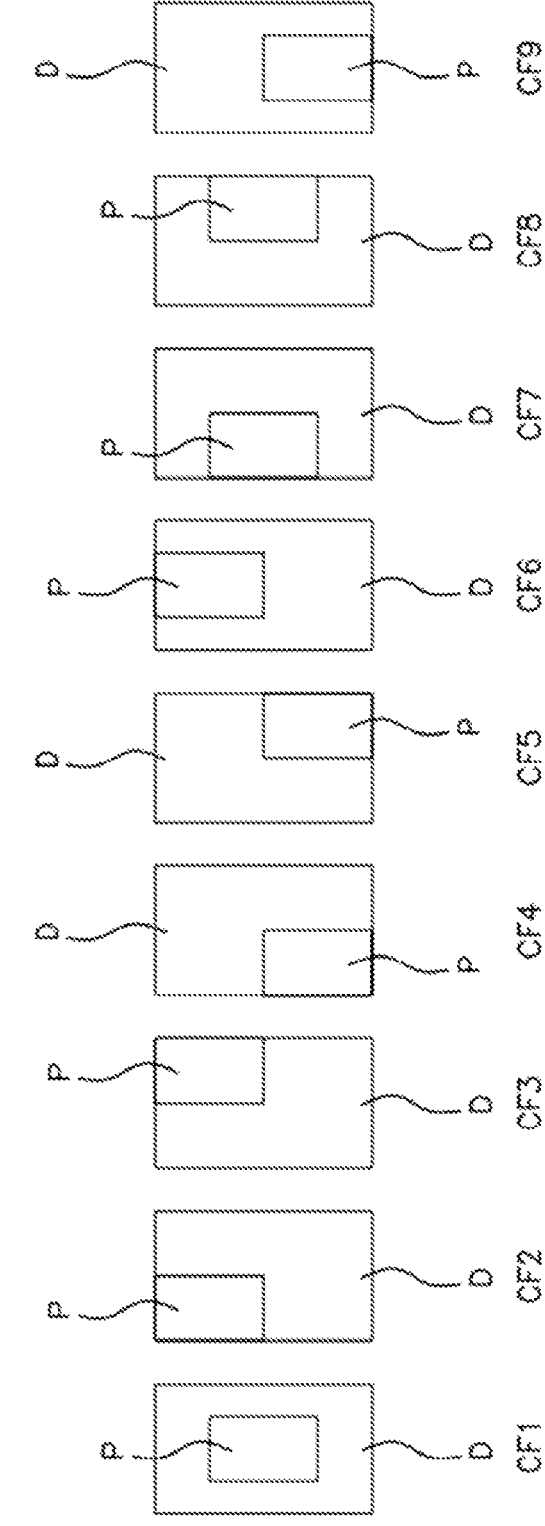
FIG. 3 illustrates nine test configurations of the detection method according to an aspect of the invention, in which the object to be charged, more precisely the mobile telephone, is placed at nine different positions on the charging surface of the charging device.

This is illustrated in FIG. 3. FIG. 3 shows nine possible positioning configurations CF1, CF2 . . . CF9 for a mobile telephone P on the charging surface S of the charging device D.

The table below shows the currents I0, I1, I2 of the three antennas A0, A1, A2 as well as the current variation ΔI for these nine configurations CF1 . . . CF9.

TABLE 1

| Configuration | I0 (mA) | I1 (mA) | I2 (mA) | ΔI (%) |
|---|---|---|---|---|
| CF1 | 100 | 84.8 | 71.2 | 22.5 |
| CF2 | 79.4 | 72 | 66.4 | 9.3 |
| CF3 | 78.6 | 72 | 66 | 9.9 |
| CF4 | 80 | 66.4 | 72.2 | 9.7 |
| CF5 | 81 | 66.8 | 71.8 | 8.4 |
| CF6 | 100 | 75.2 | 69.6 | 10.7 |
| CF7 | 99.2 | 74 | 68.4 | 10.9 |
| CF8 | 94.4 | 72.8 | 68.4 | 8.3 |
| CF9 | 100 | 79.2 | 69.2 | 18.2 |

It may be clearly seen that the presence of the mobile telephone P on the charging surface S causes a current variation ΔI greater than 8%.

Of course, the above table may be repeated for various types of mobile telephones P in order to set a single threshold S2 common to all mobile telephones P.

Indeed, the applicant has observed that the threshold value S2 above which the presence of a mobile telephone P may be detected does not vary much depending on the types of mobile telephones P, this being a significant advantage over the prior art.

It is thus possible to set a single threshold S2 for all mobile telephones P, that is to say in order to detect an object to be charged on a charging surface from among a plurality of objects to be charged, this not being possible with the methods from the prior art.

On the other hand, when no mobile telephone P is located on the charging surface S, the value of the current variation ΔI is very low.

This is illustrated in the table below:

TABLE 2

| Charging device | I0 (mA) | I1 (mA) | I2 (mA) | ΔI (%) |
|---|---|---|---|---|
| No. 1 | 64 | 66 | 62 | 0.2 |
| No. 2 | 72.8 | 66.8 | 67.6 | 1.29 |
| No. 3 | 69.2 | 64.8 | 66.4 | 2.57 |
| No. 4 | 65.6 | 62.4 | 64.4 | 3.26 |
| No. 5 | 64.4 | 69.2 | 67.6 | 2.2 |
| No. 6 | 62.8 | 61.6 | 64 | 0.07 |
| No. 7 | 61.6 | 60.8 | 61.6 | 1.32 |
| No. 8 | 59.2 | 60 | 61.6 | 2.56 |

The above table illustrates the currents I0, I1, I2 and the current variation ΔI between the three antennas A0, A1, A2 obtained for a sample of eight chargers No. 1 to No. 8 of the same type with no load, that is to say without a mobile telephone P placed on the charging surface S. The chargers differ from one another only by the tolerance of parts from charger to charger.

According to said table, it may be observed that the current variation between the three antennas is very small when no mobile telephone P is placed on the charging surface S. The current variation is below 4%.

It may also be noted that, for various charging devices of the same type, a difference in no-load current variation (without a mobile telephone placed on the charging surface) of a few percent, approximately 3%, is observed.

Figure 4:
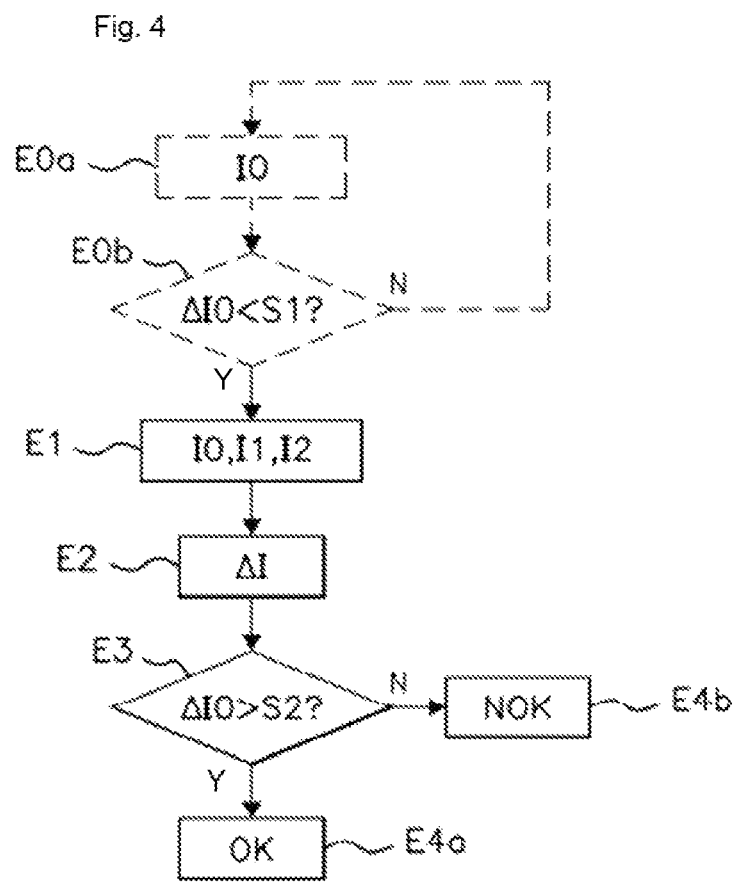

In one refinement of the detection method according to an aspect of the invention, in preliminary steps E0a and E0b shown in dotted lines in FIG. 4, the current or the value representative of the impedance I0 on the third coil A0 is calculated (step E0a) and compared with a threshold S1 (step E0b). If the current I0 is lower than this threshold S1, then the detection method is triggered in step E1.

This refinement makes it possible to trigger the method only if it is initially uncertain whether the user has placed their telephone P on the charging surface S facing the third coil A0, that is to say in the middle of the charging surface S.

Indeed, in the case of a large telephone, if this is placed on the charging surface S facing the central coil A0, then the value of the current I0 is greater than a threshold S1, equal for example to 80 mA. It is known to detect the presence of the mobile telephone as soon as the current of a coil exceeds this threshold S1.

On the other hand, the problem arises when the current I0 is lower than the threshold S1, in which case there are two possibilities: either no telephone is present on the charging surface S, or a small telephone is placed on the charging surface S, facing the central coil A0. Indeed, small mobile telephones do not significantly affect the value of the current I0 of the antenna A0. In this case, with the current I0 being lower than the threshold S1, the presence of the mobile telephone P is not detected, this being problematic. It is this problem that an aspect of the invention aims to solve.

In this case, when the value representative of the impedance I0 has a valuem5 lower than the threshold, for example at S1<80 mA (cf. Table 1), then the detection method is triggered (steps E1 to E4a, E4b).

An aspect of the invention thus cleverly makes it possible to detect the mobile telephone P on the charging surface by monitoring the current variation between the NFC coils present under the charging surface S.

Thus, if the telephone has moved or slid on the charging surface, it will still be detected as present. Moreover, the detection method according to an aspect of the invention is energy-efficient and uses the NFC coils that are already present in the charger for NFC communication with the mobile telephone P.

The NFC antennas therefore have two roles: to provide NFC communication, this being their primary function, and, according to an aspect of the invention, to detect the presence of a mobile telephone P on the charging surface S.

The invention claimed is:

1. A method for detecting an object to be charged on a charging surface of a charging device, the charging device being a parallelepiped having a length of which is parallel to a longitudinal axis, a width of which is parallel to a transverse axis, and a height of which is parallel to a vertical axis, and wherein the charging device comprises a first near-field communication antenna wound along the transverse axis around a first end of the charging device, a second near-field communication antenna wound along the transverse axis around a second end of the charging device, and a third near-field communication antenna being located between the first and second antennas, the method comprising:
   a) determining a current flowing in each of the antennas,
   b) calculating a current variation between the three antennas,
   c) comparing said variation with a predetermined current variation threshold value, and
   d) detecting the object to be charged on the surface of the charging device on the basis of the result of the comparison.

2. The detection method as claimed in claim 1, wherein the method is triggered on the basis of a result of a comparison of a determination of a current flowing in the third antenna with a predetermined value.

3. The detection method as claimed in claim 1, wherein the calculation of a current variation between the three antennas takes the following form:

$$\Delta I = \left\| \left| \frac{I0}{I1} - 1 \right| - \left| \frac{I0}{I2} - 1 \right| \right\| \times 100$$

With:

I0: current flowing in the third antenna in mA
I1: current flowing in the first antenna in mA
I2: current flowing in the second antenna in mA.

4. A computer program product comprising program code instructions for executing the steps of the method as claimed in claim 1 when said program is executed on a computer.

5. The detection method as claimed in claim 2, wherein the calculation of a current variation between the three antennas takes the following form:

$$\Delta I = \left\| \left| \frac{I0}{I1} - 1 \right| - \left| \frac{I0}{I2} - 1 \right| \right\| \times 100$$

With:

I0: current flowing in the third antenna in mA
I1: current flowing in the first antenna in mA
I2: current flowing in the second antenna in mA.

6. A device comprising a processor, at least three near-field communication antennas, two antennas each being located at one end of the device, and a third antenna being located between the two antennas, the processor adapted to execute the method as claimed in claim 1.

7. The device as claimed in claim 6, wherein the processor is further adapted for comparing a current flowing in the third antenna with a predetermined value.

8. A motor vehicle, comprising the device as claimed in claim 6.

9. The method according to claim 1, wherein the third antenna is rectangular in shape.

10. The method according to claim 1, wherein the first, second and third antennas are arranged in a plane, which is parallel to the charging surface.

* * * * *